US006675223B1

(12) United States Patent
Corl, Jr. et al.

(10) Patent No.: US 6,675,223 B1
(45) Date of Patent: Jan. 6, 2004

(54) METHOD AND APPARATUS FOR PROCESSING FRAMES USING STATIC AND DYNAMIC CLASSIFIERS

(75) Inventors: Everett Arthur Corl, Jr., Raleigh, NC (US); Clark Debs Jeffries, Durham, NC (US); Colin Beaton Verilli, Apex, NC (US)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 09/546,463

(22) Filed: Apr. 10, 2000

(51) Int. Cl.[7] .............................................. G06F 17/30
(52) U.S. Cl. ........................ 709/238; 707/3; 711/118
(58) Field of Search ................................ 711/148, 118; 370/389, 238, 335, 412; 709/225, 238; 707/100, 3; 713/201

(56) References Cited

U.S. PATENT DOCUMENTS

| | | | | |
|---|---|---|---|---|
| 5,787,430 A | * | 7/1998 | Doeringer et al. | 707/100 |
| 6,154,775 A | * | 11/2000 | Coss et al. | 709/225 |
| 6,173,364 B1 | * | 1/2001 | Zenchelsky et al. | 711/118 |
| 6,233,686 B1 | * | 5/2001 | Zenchelsky et al. | 713/201 |
| 6,289,013 B1 | * | 9/2001 | Lakshman et al. | 370/389 |
| 6,341,130 B1 | * | 1/2002 | Lakshman et al. | 370/389 |
| 6,347,376 B1 | * | 2/2002 | Attwood et al. | 713/201 |
| 6,404,752 B1 | * | 6/2002 | Allen, Jr. et al. | 370/335 |
| 6,449,256 B1 | * | 9/2002 | Varghese et al. | 370/238 |
| 6,460,120 B1 | * | 10/2002 | Bass et al. | 711/148 |
| 6,473,434 B1 | * | 10/2002 | Araya et al. | 370/412 |
| 6,505,192 B1 | * | 1/2003 | Godwin et al. | 707/3 |

OTHER PUBLICATIONS

Lakshman et al, High–Speed Policy–based Packet Forwarding Using Efficient Multi–dimensional Range Matching, 1998, ACM Press, 203–214.*
Suri et al, Packet Filtering in High Speed Networks, 1999, ACM Press, 969–970.*

* cited by examiner

Primary Examiner—Zarni Maung
Assistant Examiner—Jungwon Chang
(74) Attorney, Agent, or Firm—Bracewell & Patterson

(57) ABSTRACT

A method and apparatus for processing network frames using static and dynamic classifiers provides a flexible and modifiable frame classification system. Static and Dynamic classifiers are used in combination within a network processing system to provide the range capability and hardware assist capability of the static classifier, along with the incremental modifications possible with a dynamic classifier. The dynamic classifier is searched first for rules directing processing of a received frame. The static classifier is searched only if a dynamic classifier key for the frame is not found, or the dynamic key actions indicated that the static classifier should also be searched.

15 Claims, 5 Drawing Sheets

METHOD AND APPARATUS FOR PROCESSING FRAMES USING STATIC AND DYNAMIC CLASSIFIERS

BACKGROUND OF THE INVENTION

1. Technical Field

The present invention relates in general to computer networks, and in particular, to a network processor for managing network traffic that uses static and dynamic matching trees for processing frames.

2. Description of the Related Art

Computer networks have evolved to a point where switch routers are insufficient to handle:complex network routing and filtering requirements. Network processors, such as the International Business Machines (IBM) Network Processor (NP) have been developed to fill this need. Utilizing a connection similar to that of a network switch, an NP provides a level of control and flexibility that surpasses that of the network switch. Parallel lookup operations can be performed on a frame, complex modifications can be performed on packets, and policies can be managed at complex levels. Multiple processors are used to achieve a very high frame processing throughput.

Instructions for managing frame routing in an NP, known as "picocode," reside in memory but are directly used by the hardware to efficiently process frames according to a fixed set of rules. The rules are entered by administration software and compiled into picocode that drives the logical engines for controlling frame routing, frame filtering and Quality of Service (QoS) requests.

Two types of classifier trees can be used to implement the frame processing commands: Software Managed Trees (SMTs) and Fixed Match Trees (FMTs). SMTs provide the capability of performing operations on ranges, while FMTs only apply to a specific values i.e. Media Access Control (MAC) layer addresses. The advantage of SMTs is the support of range-operations that are required to perform such functions as Internet Protcol (IP) sub-netting, the disadvantage is they cannot be easily updated on-the-fly. Since the SMT is compiled from a set of complex rules, it cannot be updated by changing a single leaf. The entire SMT needs to be recompiled and downloaded to a pico-processor. Therefore, the rules implemented in the SMT are typically static. In contrast, dynamic rules may be implemented in an FMT. Since the rules operate on fixed values, a single dynamic rule entry may be added or deleted. Dynamic rule processing in FMTs is faster than static rule processing in SMTs, since the hashing operation to determine actions to perform in response to a given frame is direct. SMTs must perform range checking and determine if a given frame value is within the actionable range.

The present disclosure provides an improved method for processing frames by combining dynamic trees with static trees allowing use of both SMTs and FMTs.

SUMMARY OF THE INVENTION

The objective of using dynamic and static trees together to control network frame processing is achieved in a network processor. A set of dynamic classifiers is searched with a frame key to determining whether or not a dynamic classifier for processing the frame exists within the set of dynamic classifiers. If the dynamic classifier does not exist, a set of static classifiers is searched to find a static classifier having a rule for processing the frame. If a dynamic classifier was found, it may contain an indication to search or not search the static classifiers. A set of inhibit keys may also be provided as a bit field resulting from actions taken in response to dynamic classifier rules. These inhibit keys may be used to prevent duplicate actions from being generated by static classifiers that are found having actions for processing the frame.

All objects, features, and advantages of the present invention will become apparent in the following detailed written description.

BRIEF DESCRIPTION OF THE DRAWINGS

The novel features believed characteristic of the invention are set forth in the appended claims. The invention itself however, as well as a preferred mode of use, further objects and advantages thereof, will best be understood by reference to the following detailed description of an illustrative embodiment when read in conjunction with the accompanying drawings, wherein:

DETAILED DESCRIPTION OF PREFERRED EMBODIMENT

Figure 1:
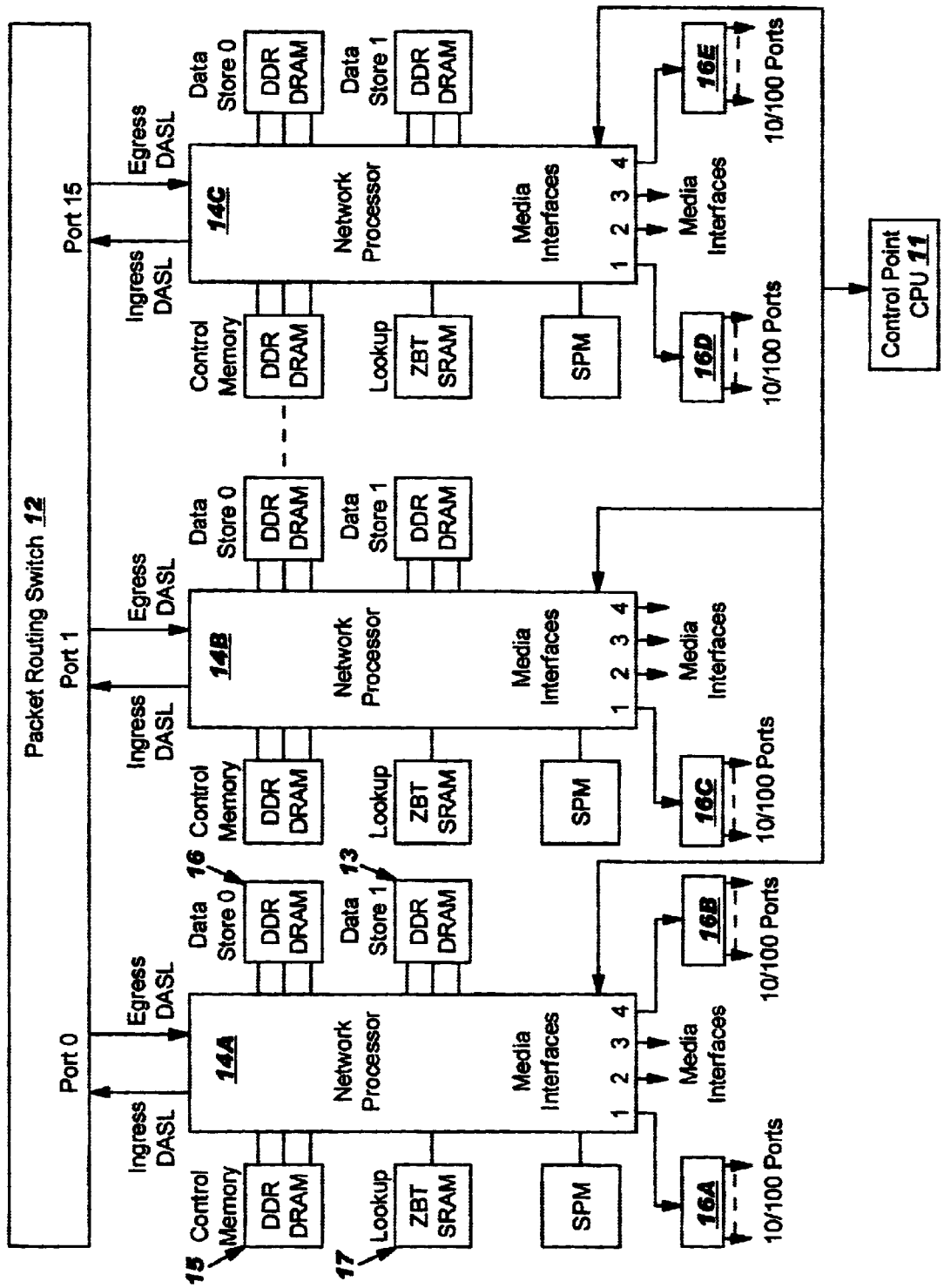
FIG. 1 is a block diagram of a network processor managed network subsystem in accordance with an embodiment of the present invention.

With reference to the figures, and in particular to FIG. 1, a network processing system in accordance with an embodiment of the present invention is depicted. A packet routing switch 12 is coupled to a group of network processors (NPs) 14A–14C. Each of NPs 14A–14C provides a media interface for connecting to networks having various protocols, such as 10 base-T or 100 base-T ethernet connections 16A–16E or other types of communication interfaces that are known in the art. Thus, NP 14A may route frames received at any of the media interfaces to port 0 on packet routing switch 12, and may perform address translations, respond to Quality-of-Service (QoS) requests, block packets, or perform any complex routing or frame processing function on the incoming frames. NP 14A via an Egress interface also receives frames from port 0 on packet routing switch 12 and may perform similar complex operations to route frames to the media interfaces. Control memory 15 provides storage for control software that drives the routing functionality and frame processing, and specifically the software managed tree (SMT) dynamic classifier of:;the present invention. A Lookup ZBT SRAM 17 provides fast access memory for storing the fixed match tree (FMT) hardware assisted matching of the present invention. A Control point (CP) central processing unit 11 provides management of network processor operations and downloading of applications, classifier trees and other data.

Figure 2:
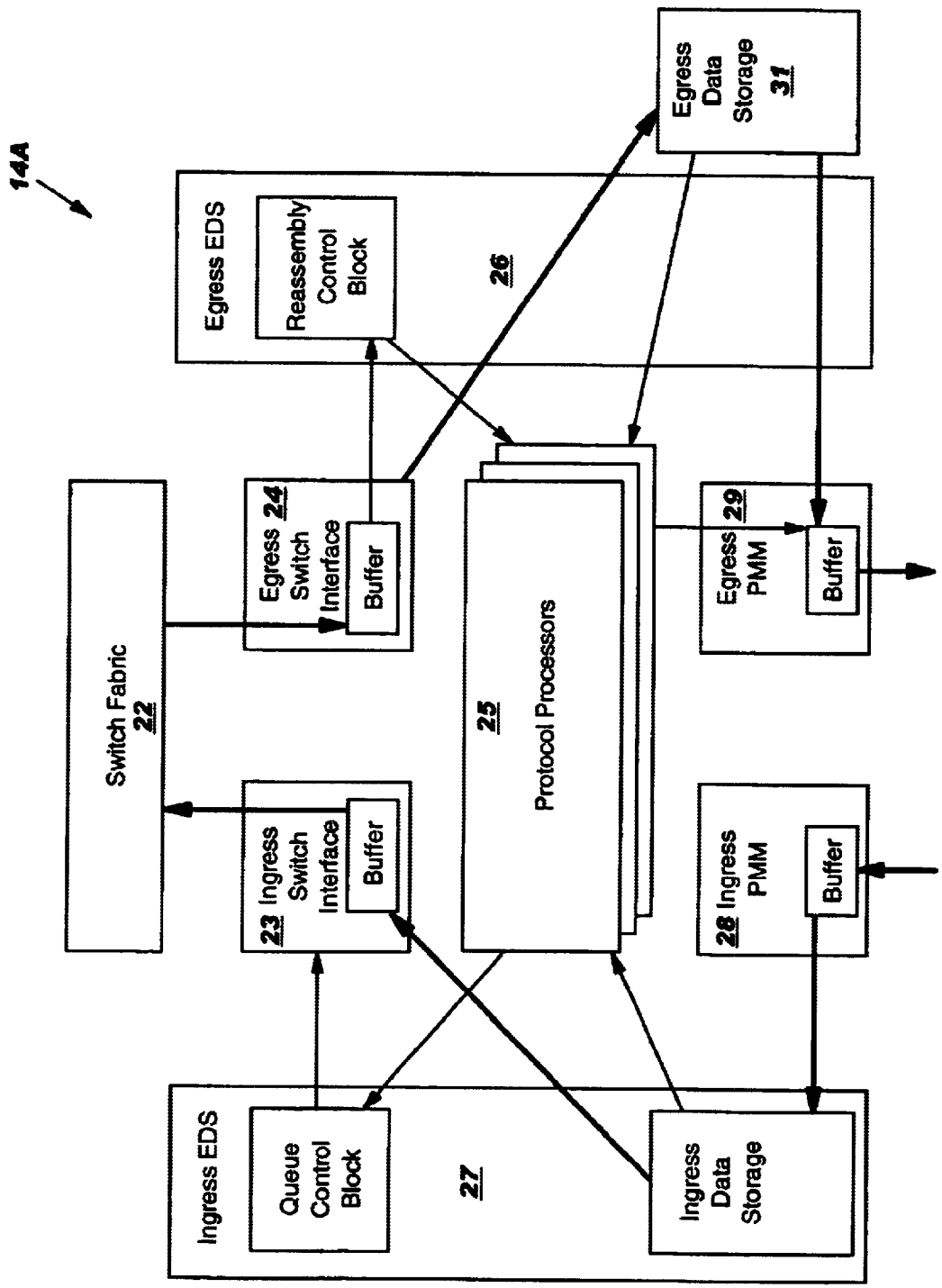
FIG. 2 is a simplified block diagram depicting frame flow within a network processor in accordance with an embodiment of the present invention.

Referring now to FIG. 2, a simplified block diagram of NP 14A is shown. An Ingress Enqueue/Dequeue/Scheduling logic (EDS) 27 manages frame buffering and control for frames routed to a switch fabric 22. Frames are received from the media interface connections by ingress physical MAC (Medium Access Control) multiplexer (PMM) 28, and are translated and processed by protocol processors 25. An ingress switch interface 23, provides a connection to switch fabric 22 and may connect to another NP or packet routing switch 12 (From FIG. 1). An egress switch interface 24 receives frame data from switch fabric 22 and the frame data is stored in an egress data storage 31. Protocol processors 25 then can perform classifier searches to process the frames and route them through an egress PMM 29.

Figure 3:
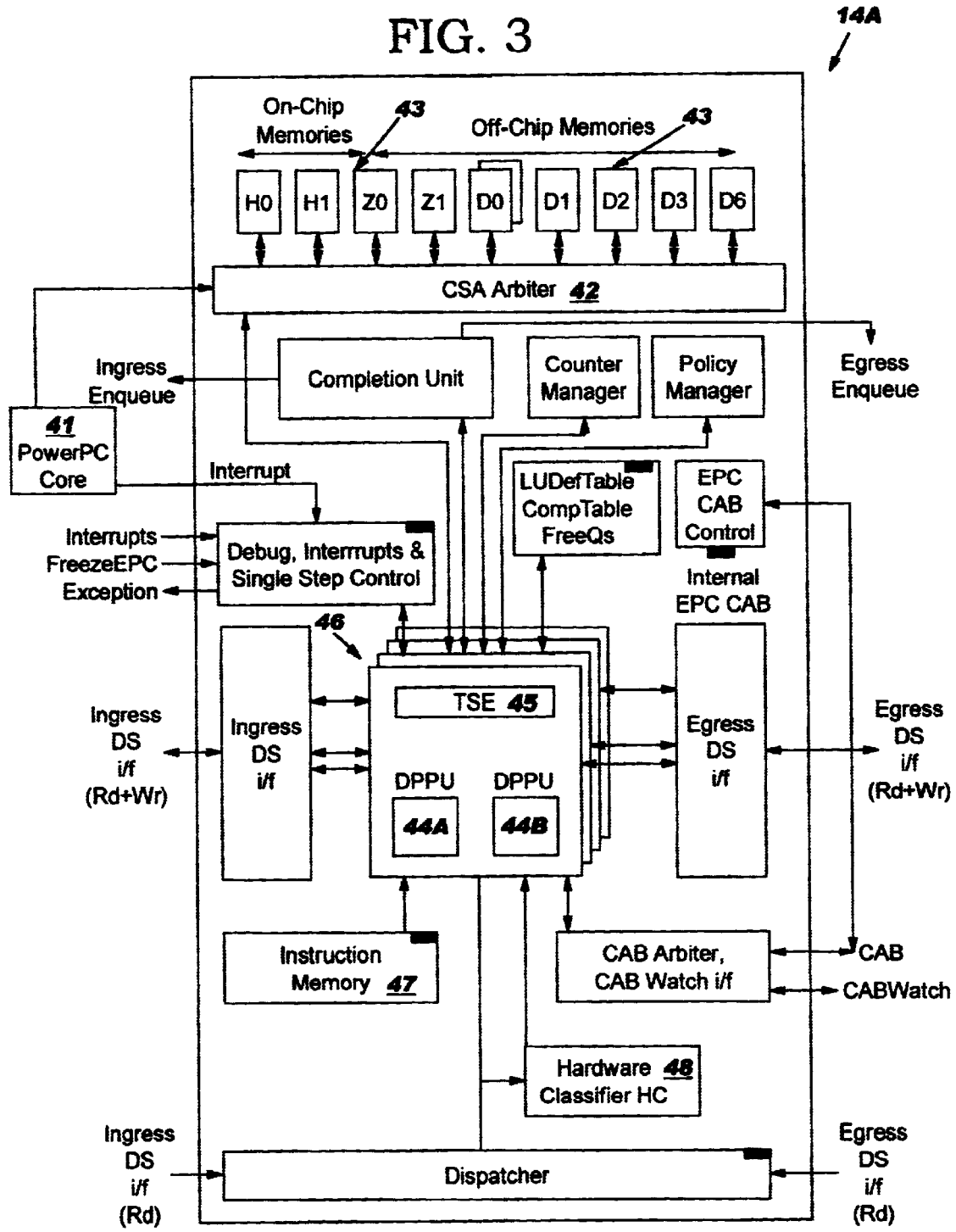
FIG. 3 is a detailed block diagram depicting a network processor in accordance with an embodiment of the present invention.

Referring now to FIG. 3, a detailed block diagram of a network processor unit 14A in accordance with a preferred embodiment of the invention is depicted. Memories 43 for storing the classifier trees are coupled to the NP by a control store arbiter 42, allowing core processing units 46 to share access to external and internal memory. Each core processing unit 46 contains dyadic protocol processing units (DPPU) 44A–44B and tree search engine 45. An instruction memory 47 is coupled to core processing unit 46 for storing the picocode that drives tree search engines 45 (TSEs). It is the tree search engine 45 operation to which the present invention pertains. A Power PC® core 41, provides management of the network processor unit 40. Software, managed tree data and fixed match tree data may be downloaded into memories 43 provide control for TSEs 45 once a leaf in the tree is matched, it is loaded into internal registers in the network processor unit 40. The trees used with TSEs are referred to as static or dynamic trees. Dynamic trees are so called because they may be updated incrementally and quickly to produce changes in the processing of frames. Static trees are not incrementally upgraded and require a reload of the tree each time the tree is modified. Static trees are useful for providing more complex matching such as applying a leaf to a range of IP addresses. A hardware classifier 48 pre-processes received frames to prepare for matching.

Figure 4:
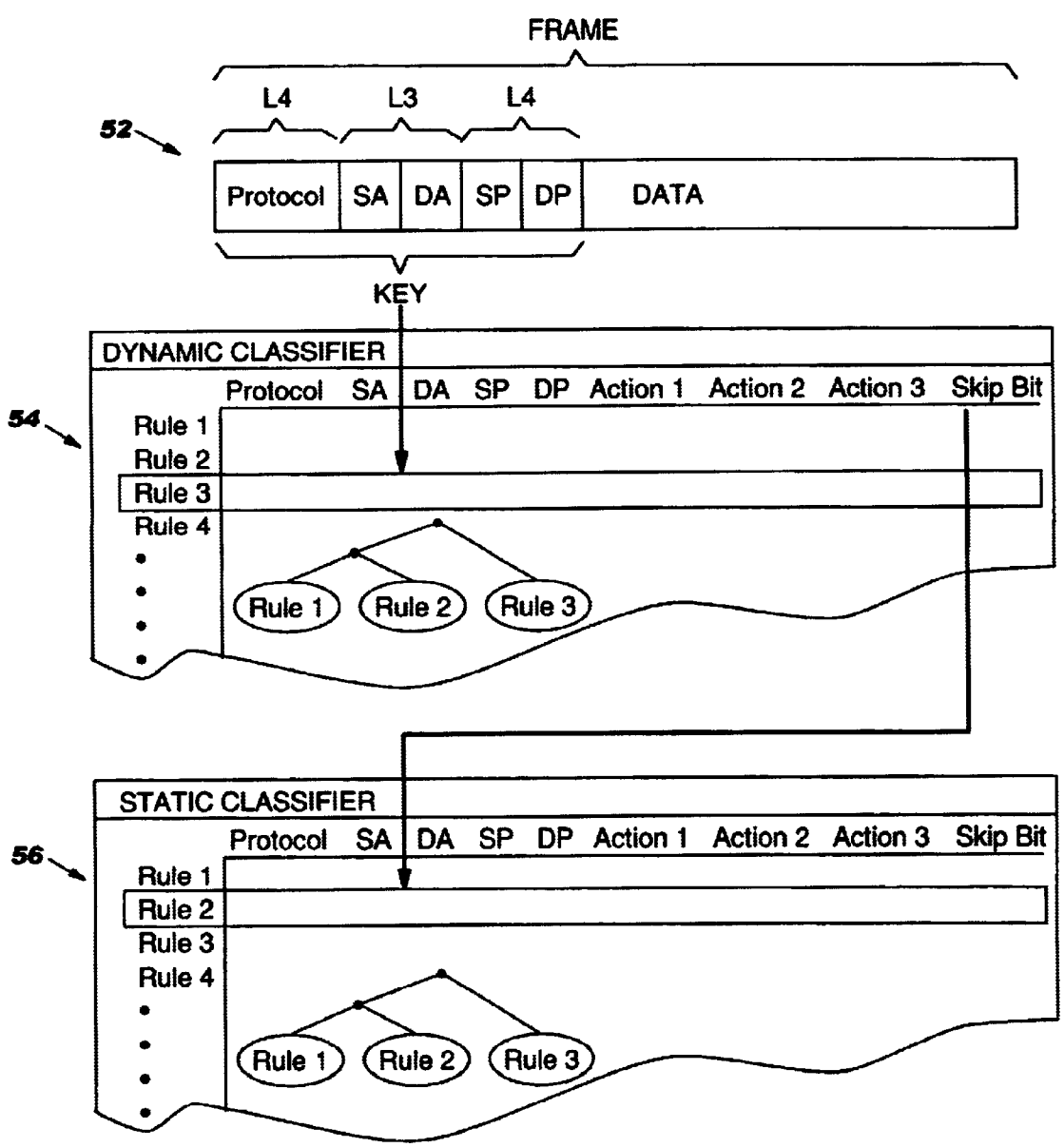
FIG. 4 is a pictorial diagram depicting a user interface for controlling configuration of classifiers within a network processing subsystem in accordance with an embodiment of the present invention.

Referring now to FIG. 4, a pictorial illustration of the relation of frame information and the structure of classifiers as controlled by a user interface is depicted. A received frame 52 contains a key formed from a protocol identifier, a source address (SA), a destination address (DA), a source port number (SP), and a destination port number (DP). Using all or part of this key, a frame classifier can decide what action to take for each received frame. This is done by a set of processing rules that produce actions when applied to a frame for which the key matches the pattern in the rule. Within the dynamic classifier, the match is a fixed match or a "longest prefix match" (LPM). For a fixed match a particular key is matched to the pattern in the rule. An LPM ignores suffix portions of the key, such as the port number. This allows for sub-setting of addresses, but not to the level of complexity supported by a SMT. A SMT can use very complex rules based upon any portion of the key and may include ranges or lists of values. These complex rules may be developed in a high level language or may be created via an interface that supports ranges and lists. The rules are compiled into a tree to provide efficient processing of frames. Unlike the dynamic classifier tree, the static classifier tree must be updated in its entirety, since changing one node or leaf might affect the operation of any part of, the tree. The dynamic classifier tree may be updated by providing new leaf or node data and insertion point information to modify the tree.

User interfaces 54 and 56, as might be generally provided by a tree management application running on control point CPU 11, manage or create the classifier trees of the present invention. A set of rules is managed for a dynamic classifier via a dynamic classifier creation interface 54 and a series of actions may be specified for each rule. Examples of action types are L3 filtering, QoS and network dispatch (server load balancing). Data to be used in association with an action can be specified, as well as relative priority of action application. Unique to the present invention, a skip bit can be specified for the dynamic classifier leaf. This skip bit is used to prevent the search of a static classifier, so that actions according with the static classifier can be overridden by new dynamic classifier tree nodes. This allows for modification of the behavior of the network processor due to the SMT by adding one or more FMT keys replacing the former SMT action and specifying a skip bit for the matching frames. The static classifier creation interface 56 is similar to the dynamic classifier creation interface 54, but there is no need for the skip bit. After creation, the classifier trees are downloaded from the control point CPU 11 to memories 43 where they can be used by the network processor unit 40.

When the static classifier tree is being rebuilt, all of the skip bits in the dynamic classifier tree must be cleared, as the new static classifier tree may contain actions to be performed that are not in the dynamic classifier tree.

In addition to the use of a skip bit, inhibit bits can be used to prevent duplicate actions from occurring due to actions specified by the dynamic classifier and the static classifier rules that are intended to act on the same frame specifier. For instance, if a rule specifying network dispatch for a frame exists in the dynamic classifier and a media frame is queued for dispatch on one of the media interfaces, it would be desirable to prevent a rule in the static classifier that acts on the frame from queuing a duplicate frame. This is another feature that enables the override of static key behavior based on a dynamic key update. A single set of flag bits may be used temporarily to inhibit actions for each frame as actions are assigned by the rules found in the match trees.

Figure 5:
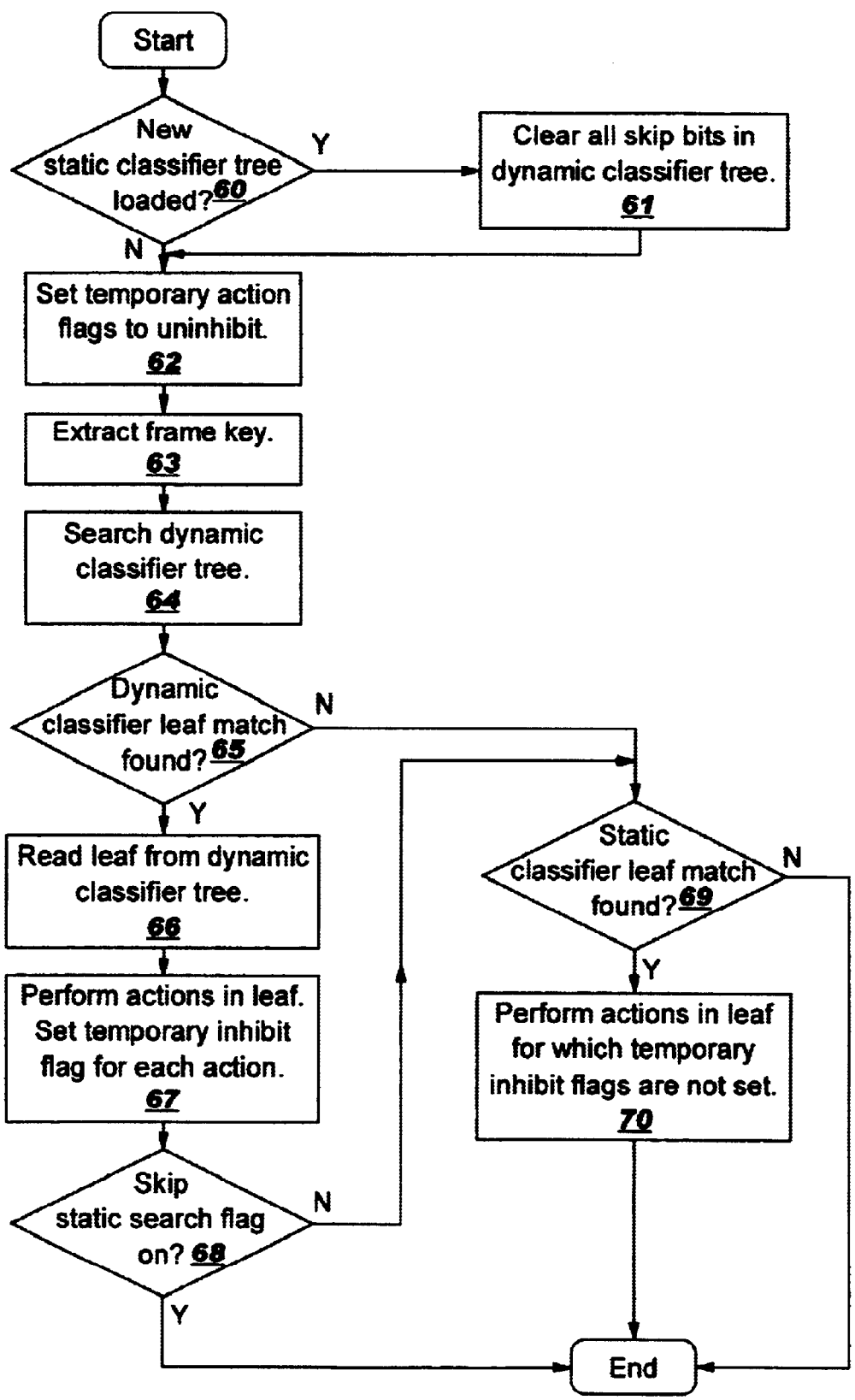
FIG. 5 is flowchart depicting a method for processing frames within a network processor managed network subsystem, in accordance with an embodiment of present invention.

Referring now to FIG. 5, there is illustrated a flowchart of a method for processing frames in accordance with a preferred embodiment of the invention. If a new static classifier tree has been loaded (decision 60), the dynamic classifier tree is cleared of all skip bits (step 61). Temporary action flags are set to uninhibit (step 62), since no action has yet been performed. The frame key, which includes protocol and source and destination address and port numbers, is extracted (step 63). Then, the dynamic classifier is searched (step 64), and if a pattern matching the frame key is found (decision 65), the corresponding leaf is read (step 66). The indicated actions are performed and any inhibit flag bits are set to prevent duplicate actions (step 67). If the dynamic classifier key skip bit is set (decision 68), frame processing is complete. The skip bit is set when all static classifier actions are inhibited at the end of the static classifier search. This occurs when the actions were already performed by the dynamic classifier. This speeds processing, as the static classifier search can be completely bypassed. Otherwise, the static classifier is searched for a match (step 69) and if actions are found for the frame, the actions with temporary action flags set to uninhibit are performed (step 70). If all of the actions were inhibited (decision 71), then the search was unnecessary, so the skip bit in the dynamic tree leaf is set (step 72) to prevent further searches of the static classifier tree for the particular key. Thus the skip bit will prevent unnecessary searches of the static key unless the static classifier tree is changed, at which point all of the skip bits will be cleared (step 61). The clearing of the dynamic classifier tree skip bits is preferably performed as part of the static classifier tree building and downloading process and does not have to be performed as part of the frame processing flow.

While the invention has been particularly shown and described with reference to a preferred embodiment, it will be understood by those skilled in the art that various changes in form and detail may be made therein without departing from the spirit and scope of the invention.

What is claimed is:

1. A method for processing frames in a network processing system, said method comprising:

receiving a frame at an input to said network processing system;

constructing a key in conformance with information contained in said received frame;

searching a dynamic classifier tree for a dynamic tree leaf containing a pattern that matches said constructed key;

in response to said dynamic tree leaf being found within said dynamic classifier tree, processing said received frame according to a first rule contained within said dynamic tree leaf, setting an inhibit indication for preventing a static tree leaf from causing performance of a duplicate set of actions associated with said dynamic tree leaf; and in response to said dynamic tree leaf not being found within said dynamic classifier tree, searching a static classifier to find a static tree leaf containing a pattern that matches said key and processing said received frame according to a second rule contained within said static tree leaf only if said inhibit indication is not set.

2. The method of claim 1, wherein said method further comprises:

in response to said dynamic tree leaf being found within said dynamic classifier tree, determining whether or not said dynamic tree leaf includes an indication indicating that said static classifier tree should be searched; and in response to a determination that said dynamic key leaf includes an indication indicating that said static classifier tree should be searched, searching said static classifier tree for a static tree leaf containing a pattern that matches said constructed key.

3. The method of claim 1, wherein said inhibit indication comprises a plurality of inhibit bits each corresponding to a particular action associated with said dynamic tree leaf, and said processing said frame according to said second rule further includes performing actions selectively in conformity with a combination of said plurality of inhibit bits.

4. The method of claim 1, wherein said, dynamic tree leaf specifies a plurality of actions, said inhibit indication comprises a plurality of inhibit bits each corresponding to a particular one of said plurality of actions, and said processing said frame according to said second rule performs only actions for which an associated inhibit bit is not set.

5. A network processor for directing network communications, said network processor comprising:

means for receiving a network communications frame;

means for storing a dynamic classifier tree and a static classifier tree; and a frame classifier for processing said network communications frame according to rules contained within said static classifier tree and said dynamic classifier tree, wherein said dynamic classifier tree is searched for a dynamic tree leaf that matches a key constructed from information contained within said frame, and said static classifier tree is searched for a static tree leaf that matches said key when said dynamic tree leaf is not found, wherein said frame classifier includes means for setting an inhibit indication for preventing said frame classifier from causing performance of a duplicate action when performing an action specified by said dynamic tree leaf, and said frame classifier further includes means for skipping said duplicate action in conformity with said inhibit indication when said duplicate action is specified by said static tree leaf.

6. The network processor of claim 5, wherein said dynamic tree leaf contains an indication of whether or not to search said static classifier tree, and wherein said frame classifier searches said static classifier tree only if said indication indicates said static classifier tree should be searched.

7. The network processor of claim 6, wherein said frame classifier further includes means for searching said static classifier tree to find a static tree leaf containing a pattern that matches said constructed key, and means for processing said frame according to a rule contained within said static tree leaf.

8. The network processor of claim 7, wherein said dynamic tree leaf contains an indication of whether or not to search said static classifier, and wherein said frame classifier includes mean for searching said static classifier tree only if said indication indicates said static classifier tree should be searched.

9. The network processor of claim 5, wherein said inhibit indication comprises a plurality of bits, and said frame classifier sets said bits according to specific actions taken when processing actions specified by said dynamic tree leaf, and said frame classifier further includes means for performing an action found in a rule within said static tree leaf only if a particular bit corresponding to said action is not set.

10. The network processor of claim 5, wherein said dynamic classifier tree specifies a plurality of actions, said inhibit indication comprises a plurality of bits each corresponding to one of said plurality of actions, and wherein said frame classifier further includes means for performing actions specified by rules within said static classifier tree only if a corresponding one of said plurality of bits is not set.

11. A network processing system, comprising:

a switch for routing network traffic;

at least one network processor coupled to said switch for processing frames entering and exiting said switch, wherein said network processor includes means for setting an inhibit indication for preventing said network processor from causing performance of a duplicate action when performing an action specified by said dynamic tree leaf, and said network processor further means for skipping said duplicate action in conformity with said inhibit indication when said duplicate action is specified by said static tree leaf;

a memory coupled to said network processor for storing control information forming a dynamic classifier tree and a static classifier tree for controlling the processing of said frames, wherein said network processor searches said static classifier tree for a static tree leaf having a pattern matching a key extracted from a frame in response to said network processor determining that said dynamic classified tree does not contain a dynamic tree leaf having a pattern matching said key; and a general purpose processor for managing said control information, wherein said general purpose processor includes an interface for configuring said static classifier tree and said dynamic classifier tree.

12. The network processing system of claim 11, wherein said dynamic tree leaf contains an indication of whether or not to search said static classifier tree, and wherein said network processor includes means for searching said static classifier tree only if said indication indicates said static classifier tree should be searched.

13. The network processing system of claim 12, wherein said network processor further includes means for searching said static classifier to find a static tree leaf containing a pattern matching said key, and means for processing said frame according to a rule contained within said static key leaf.

14. The network processing system of claim 13, wherein said network processor includes means for setting an indication of whether or not to search said static classifier tree in response to a rule contained within said dynamic tree leaf, and means for only searching said static classifier tree if said indication indicates said static classifier tree should be searched.

15. The network processing system of claim 11, wherein said inhibit indication comprises a plurality of bits, and said network processor sets said bits according to specific actions taken when processing frame according to said dynamic tree leaf, and said network processor further means for performing an action found in a rule within said static tree leaf only if a particular bit corresponding to said action is not set.

* * * * *